(12) United States Patent
LeBeau et al.

(10) Patent No.: US 10,612,608 B2
(45) Date of Patent: Apr. 7, 2020

(54) BALL RETENTION ASSEMBLY FOR SYNCHRONOUS ENGAGEMENT CLUTCH

(71) Applicant: Hamilton Sundstrand Corporation, Charlotte, NC (US)

(72) Inventors: Erik D. LeBeau, Mokena, IL (US); Weishun Willaim Ni, Rockton, IL (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 104 days.

(21) Appl. No.: 15/906,442

(22) Filed: Feb. 27, 2018

(65) Prior Publication Data

US 2019/0264761 A1 Aug. 29, 2019

(51) Int. Cl.
| F16D 43/06 | (2006.01) |
| F16D 11/14 | (2006.01) |
| F16D 43/08 | (2006.01) |
| F16D 41/22 | (2006.01) |

(52) U.S. Cl.
CPC .............. *F16D 43/06* (2013.01); *F16D 11/14* (2013.01); *F16D 43/08* (2013.01); *F16D 41/22* (2013.01)

(58) Field of Classification Search
None
See application file for complete search history.

(56) References Cited

U.S. PATENT DOCUMENTS

| 3,184,025 A * | 5/1965 | Aschauer | ................ F16D 43/08 192/105 R |
| 4,322,985 A | 4/1982 | Mortensen | |
| 5,419,420 A | 5/1995 | Quenneville | |
| 5,496,154 A * | 3/1996 | Hall, III | ................ F16D 25/02 192/105 B |
| 6,464,061 B1 * | 10/2002 | Inoue | ..................... F16D 7/028 188/134 |
| 9,157,494 B2 | 10/2015 | Mitchell et al. | |
| 2005/0000775 A1 * | 1/2005 | Drussel | ................ F16D 43/08 192/105 B |
| 2011/0180365 A1 * | 7/2011 | Overton | ................ F16D 43/10 192/105 R |

FOREIGN PATENT DOCUMENTS

| EP | 0592352 A2 | 4/1994 |
| GB | 866046 A | 4/1961 |

OTHER PUBLICATIONS

Search Report dated Aug. 6, 2019 in U381048EP, EP Application No. 19158856.5, 7 pages.

* cited by examiner

*Primary Examiner* — Timothy Hannon
(74) *Attorney, Agent, or Firm* — Cantor Colburn LLP

(57) ABSTRACT

A synchronous engagement clutch (SEC) assembly is provided. The SEC assembly includes a starter ball guide and a carrier support. The starter ball guide includes opposed first and second sides and the carrier support includes opposed first and second sides. The first side of the starter ball guide defines an annular groove and the second side of the carrier support defines pockets. The starter ball guide and the carrier support are disposable with the first side of the starter ball guide facing the second side of the carrier support such that engagement balls are retainable in the pockets and the annular groove.

18 Claims, 5 Drawing Sheets

BALL RETENTION ASSEMBLY FOR SYNCHRONOUS ENGAGEMENT CLUTCH

BACKGROUND

The following description relates to a synchronous engagement clutch and, more specifically, to a ball retention assembly for a synchronous engagement clutch.

An air turbine starter (ATS) is an engine accessory which drives an internal combustion engine to a required speed prior to ignition during start up. The ATS is driven with pressurized air regulated by a starter air valve (SAV). Pressurized air, usually delivered from an auxiliary power unit (APU), cross-bleed from a running engine or an external air cart is directed into the turbine blades to cause the rotor to rotate. This interacts with a gear reduction stage and clutch component, which then delivers mechanical power to the accessory gearbox. Rotation from the gearbox in turn rotates the high pressure (HP) engine rotor assembly to induce airflow through the engine and consequently causes the rotation of the low pressure (LP) rotor. Once the engine has reached a determined cut-off speed, the starter control valve (SCV) cuts off air flow and the starter disengages the drive train through the action of its clutch.

BRIEF DESCRIPTION

According to an aspect of the disclosure, a synchronous engagement clutch (SEC) assembly is provided. The SEC assembly includes a starter ball guide and a carrier support. The starter ball guide includes opposed first and second sides and the carrier support includes opposed first and second sides. The first side of the starter ball guide define an annular groove and the second side of the carrier support defines pockets. The starter ball guide and the carrier support are disposable with the first side of the starter ball guide facing the second side of the carrier support such that engagement balls are retainable in the pockets and the annular groove.

In accordance with additional or alternative embodiments, a profile of the second side of the carrier support at each of the pockets mimics a profile of the first side of the starter ball guide at the annular groove.

In accordance with additional or alternative embodiments, the annular groove tapers with increasing radial distance from the aperture and an inner diameter of the first side of the starter ball guide is taller than an outer diameter thereof.

In accordance with additional or alternative embodiments, wherein the carrier support includes radial dividers delimiting each pocket.

In accordance with additional or alternative embodiments, a profile of each radial divider mimics a profile of the annular groove.

In accordance with additional or alternative embodiments, each pocket has a depth which is at least equal or greater than a radius of the engagement balls.

In accordance with additional or alternative embodiments, each pocket has a circumferential width which exceeds a diameter of the engagement balls.

According to another aspect of the disclosure, a synchronous engagement clutch (SEC) assembly is provided and includes engagement balls, a starter ball guide and a carrier support. The starter ball guide includes opposed first and second sides and defines a first aperture extending between the first and second sides. The carrier support includes opposed first and second sides and defines a second aperture extending between the first and second sides. The first side of the starter ball guide defines an annular groove about the first aperture and the second side of the carrier support defines pockets arrayed about the second aperture. The starter ball guide and the carrier support are disposable with the first side of the starter ball guide facing the second side of the carrier support at a distance at which the engagement balls are respectively retainable in corresponding ones of the pockets and the annular groove.

In accordance with additional or alternative embodiments, a profile of the second side of the carrier support at each of the pockets mimics a profile of the first side of the starter ball guide at the annular groove.

In accordance with additional or alternative embodiments, the annular groove tapers with increasing radial distance from the first aperture and an inner diameter of the first side of the starter ball guide is taller than an outer diameter thereof.

In accordance with additional or alternative embodiments, the carrier support includes radial dividers delimiting each pocket.

In accordance with additional or alternative embodiments, a profile of each radial divider mimics a profile of the annular groove.

In accordance with additional or alternative embodiments, each pocket has a depth which is at least equal or greater than a radius of the engagement balls.

In accordance with additional or alternative embodiments, each pocket has a circumferential width which exceeds a diameter of the engagement balls.

According to yet another aspect of the disclosure, a synchronous engagement clutch (SEC) assembly is provided and includes a starter ball guide and a carrier support. The starter ball guide includes opposed first and second sides and the carrier support includes opposed first and second sides. The first side of the starter ball guide includes a steep-walled inner diameter, a shallow-tapered outer diameter and a curved central diameter radially interposed between the steep-walled inner diameter and the shallow-tapered outer diameter to define an annular groove. The second side of the carrier support includes an inwardly curving sidewall and radial dividers extending from the inwardly curving sidewall to define pockets. The starter ball guide and the carrier support are disposable with the first side of the starter ball guide facing the second side of the carrier support such that engagement balls are retainable in the pockets and the annular groove.

In accordance with additional or alternative embodiments, a profile of the second side of the carrier support at each of the pockets mimics a profile of the first side of the starter ball guide at the annular groove.

In accordance with additional or alternative embodiments, the starter ball guide and the carrier support are formed to define first and second apertures, respectively, the annular groove tapers with increasing radial distance from the first aperture and an inner diameter of the first side of the starter ball guide is taller than an outer diameter thereof.

In accordance with additional or alternative embodiments, a profile of each radial divider mimics a profile of the annular groove.

In accordance with additional or alternative embodiments, each pocket has a depth which is at least equal or greater than a radius of the engagement balls.

In accordance with additional or alternative embodiments, each pocket has a circumferential width which exceeds a diameter of the engagement balls.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

These and other advantages and features will become more apparent from the following description taken in conjunction with the drawings.

DETAILED DESCRIPTION

Figure 1:
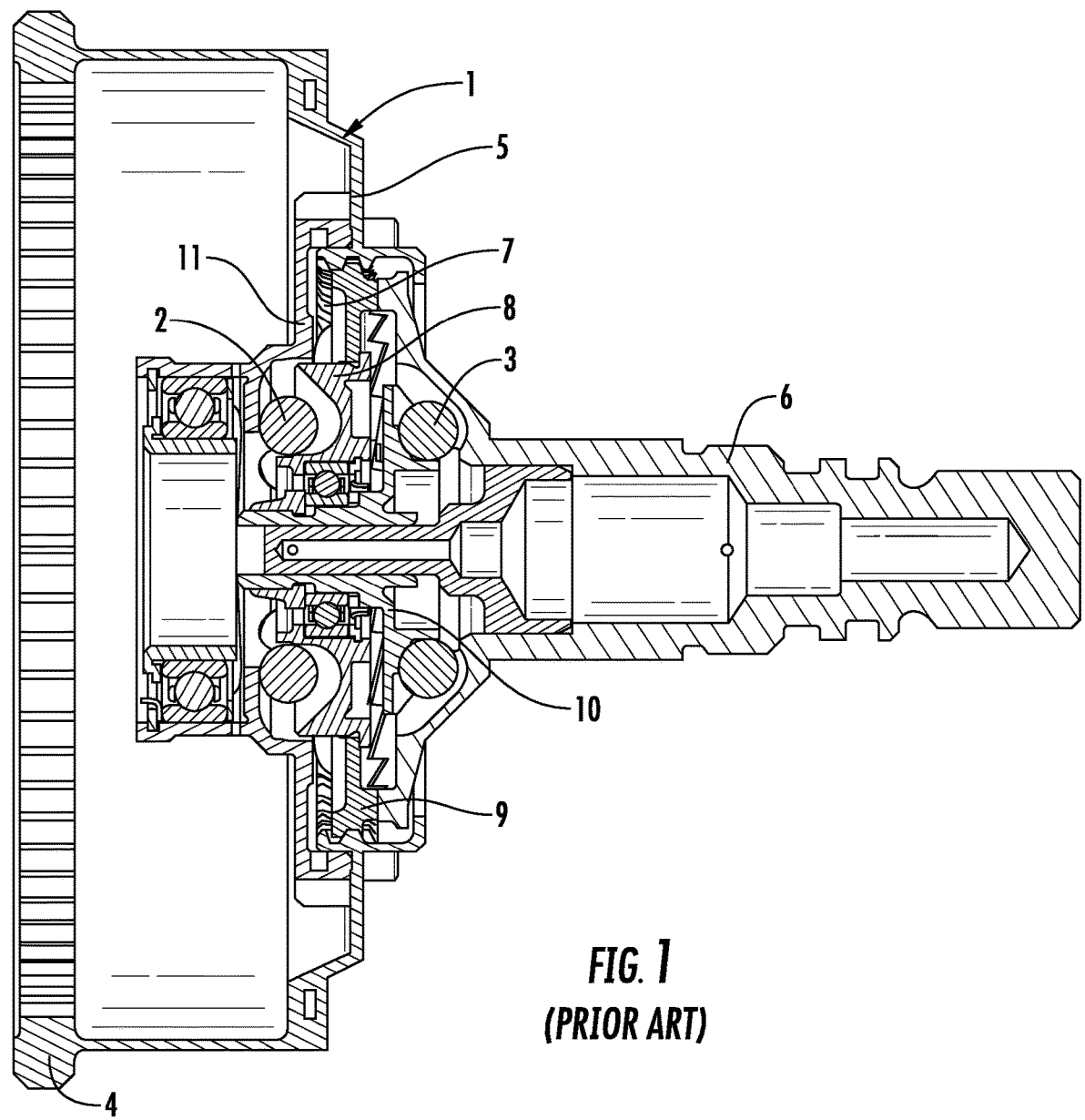
FIG. 1 is a side cutaway view of a synchronous engagement clutch (SEC)
Figure 2A:
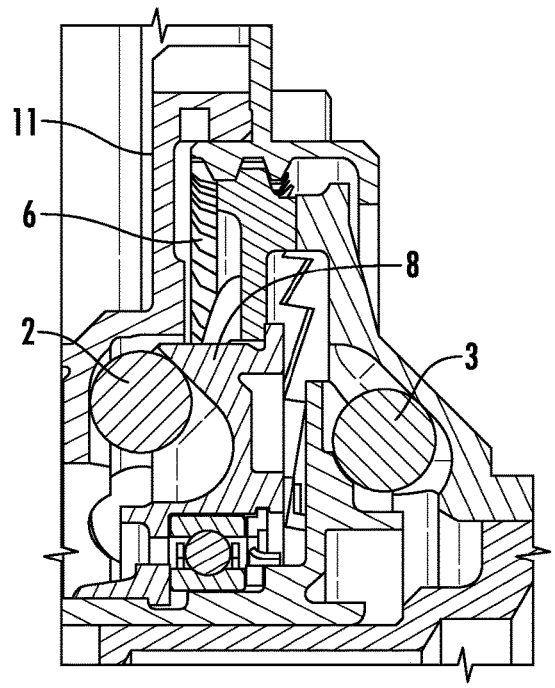
FIG. 2A is a side cutaway view of the SEC of FIG. 1 in an engaged state.
Figure 2B:
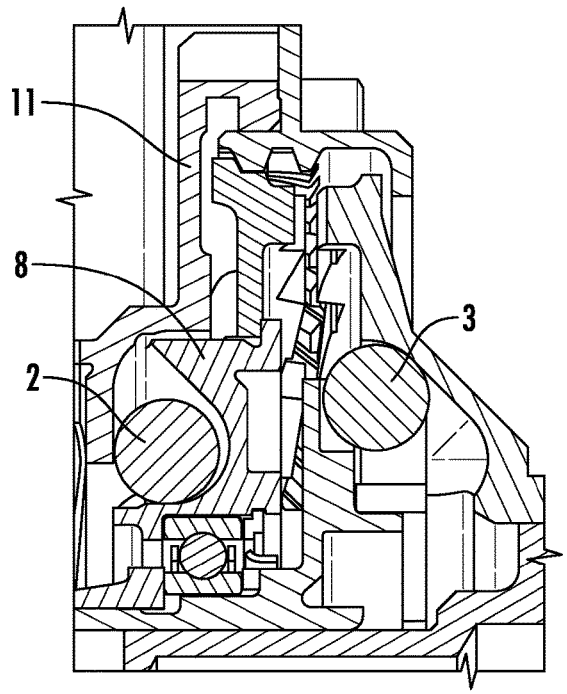
FIG. 2B is a side cutaway view of the SEC of FIG. 1 in a disengaged state.
Figure 3:
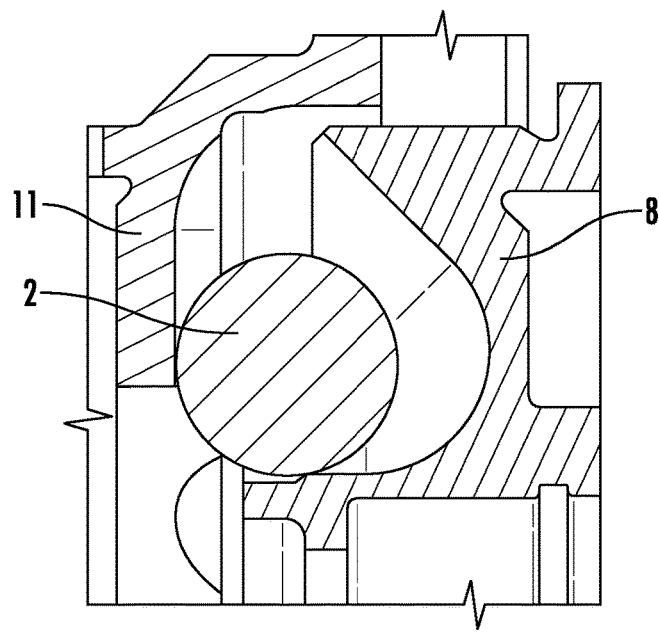
FIG. 3 is an enlarged view of the encircled portion of FIG. 2B.

With reference to FIGS. 1-3, operations of a synchronous engagement clutch (SEC) 1 are illustrated. The SEC 1 uses engagement balls 2 and disengagement balls 3 to actuate the SEC 1 between an engaged state (see FIG. 2) and a disengaged state (see FIG. 3). As ring gear 4 and carrier ring gear 5 and the output shaft 6 rotate, a radial centrifugal force is created from the engagement balls 2 and the disengagement balls 3. The engagement balls 2 and a spring 7 oppose the radial centrifugal force created by the disengagement balls 3 as the starter rotates. This force balance is transmitted through a starter ball guide 8, a jaw clutch 9 and an output ball guide 10. In the first stage of startup, both the ring gear 4 and carrier support 11 rotate with the output shaft 6 and cause connected gearbox drive shaft to drive the engine to rotate up to start-up (ignition) speed. As the starter builds up speed, the engagement balls 2 and the spring 7 work against the disengagement balls 3. Since there are typically eight engagement balls 2 and only four disengagement balls 3, both shafts spinning at the same speed results in a net force keeping the SEC 1 in the engaged state.

With increased N2 rotation, engine ignition will be turned on once cut-out speed has been achieved. The starter air valve (SAV) then cuts off the starter from the air supply. At this point, the starter side of the SEC 1 begins decelerating due to starter turbine air resistance and frictional forces between mechanical components. At this operating point, the output shaft speed continues to increase up to ground idle speed due to the engine having been lit. The output shaft 6 exceeding the speed of the starter's ring gear 4 results in ratcheting. Once the speed differential between the two shafts reaches a certain speed, the forces from the disengagement balls 3 overcome the force of the engagement balls 2 and the spring 7. The teeth on the jaw clutch 9 and teeth on the output shaft 6 separate and disengage the drive train of the starter.

In a conventional SEC 1, as shown in FIG. 3, the starter ball guide 8 and the carrier support 11 both share responsibility in retaining the engagement balls 2 within their respective pockets. While this usually stops the engagement balls 2 from escaping the pockets, an escape of an engagement ball 2 may result in the starter ball guide 8 getting stuck and in the SEC 1 being unable to assume the disengaged state. A redesign of the starter ball guide 8 can completely prevent engagement ball 2 escape but such a redesign can result in an edge contact of the engagement ball 2 and the carrier support 11 pocket due to the ratio of retention between the starter ball guide 8 and the carrier support 11. This leads to unforeseen wear in the pockets.

Thus, as will be described below, an SEC is provided with retention improvement which transfers all or most retention responsibility to the carrier support. The starter ball guide is modified to have an annular groove with an increasing diameter that tapers radially outwardly. This transmits all axial forces for the force balance between the engagement balls and the disengagement balls. The carrier support geometry is also modified in that the carrier support includes dividers that are extendable into the annular groove to define pockets in which the engagement balls are retainable. In some cases, the SEC or, more particularly, the carrier support can be modified or otherwise configured such that the pockets will have a retention capability that is greater than the radius of the engagement balls to ensure full face contact.

Figure 4:
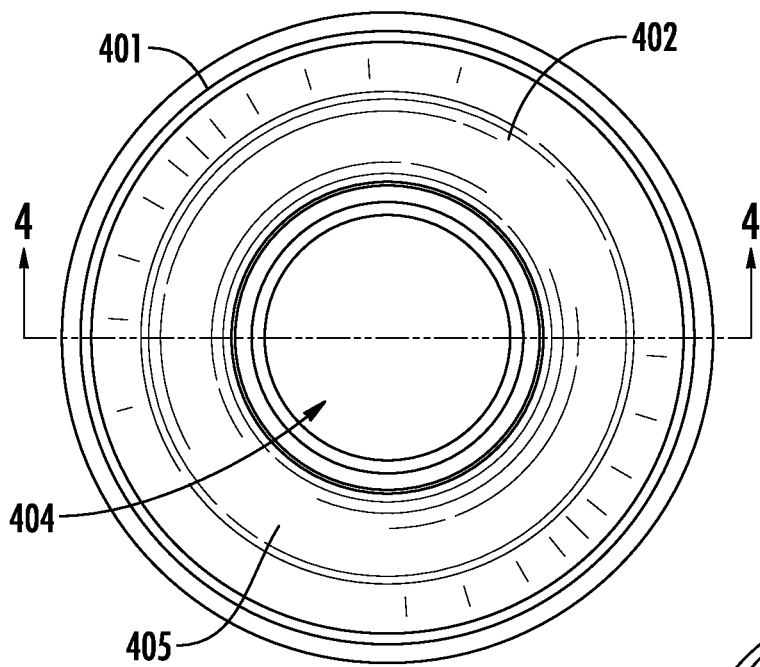
FIG. 4 is an axial view of a modified starter ball guide for use in the SEC of FIGS. 1-3 in accordance with embodiments.
Figure 5:
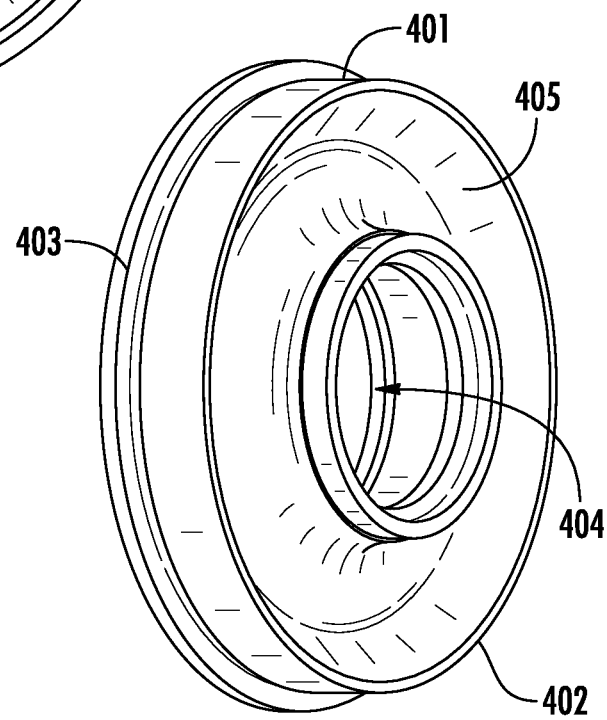
FIG. 5 is a perspective view of the modified starter ball guide of FIG. 4.
Figure 6:
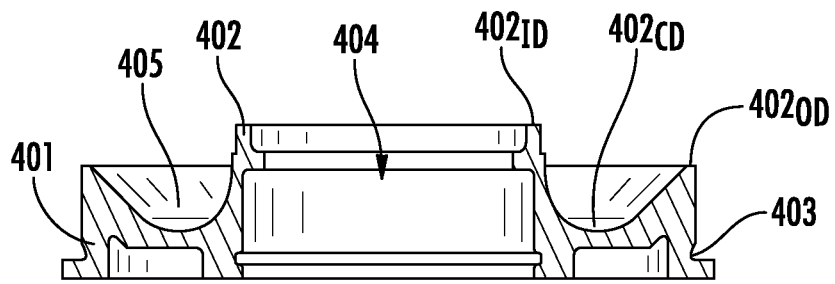
FIG. 6 is a side cutaway view of the modified starter ball guide of FIG. 4 taken along line 4-4.

With reference to FIGS. 4-6 (and FIGS. 10 and 11), a modified starter ball guide 401 for use in the SEC 1 of FIGS. 1-3 in particular is provided. In addition, with reference to FIGS. 7-9 (and FIGS. 10 and 11), a modified carrier support 601 for use in the SEC 1 of FIGS. 1-3 in particular is provided.

As shown in FIGS. 4-6, the modified starter ball guide 401 includes a first side 402 and a second side 403 that opposes the first side 402. The modified starter ball guide 401 is also formed to define a first aperture 404 that extends through the modified starter ball guide 401 between the first side 402 and the second side 403. During operations of the SEC 1, the modified starter ball guide 401 is rotatable about a central longitudinal axis of the first aperture 404.

The first side 402 is formed to define an annular groove 405 that extends circumferentially about the first aperture 404. In particular, the first side 402 includes a steep-walled inner diameter $402_{ID}$, a shallow-tapered outer diameter $402_{OD}$ and a curved central diameter $402_{CD}$ that is radially interposed between the steep-walled inner diameter $402_{ID}$ and the shallow-tapered outer diameter $402_{OD}$ to define the annular groove 405 such that the annular groove 405 tapers with increasing radial distance from the first aperture 404. In accordance with embodiments, the steep-walled inner diameter $402_{ID}$ may be taller than the shallow-tapered outer diameter $402_{OD}$ as measured from the surface of the annular groove 405.

Figure 7:
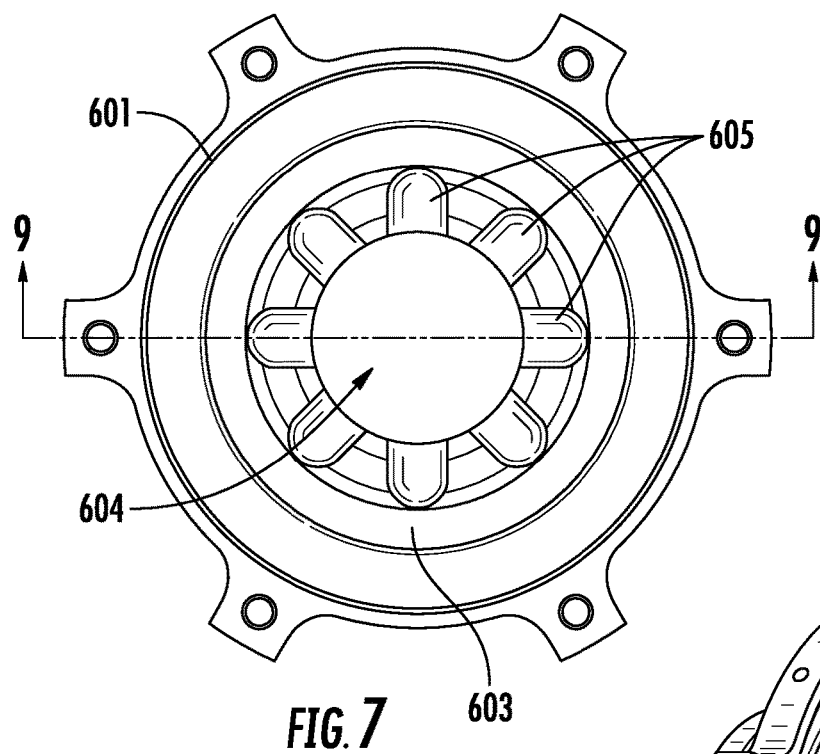
FIG. 7 is an axial view of a modified carrier support for use in the SEC of FIGS. 1-3 in accordance with embodiments.
Figure 8:
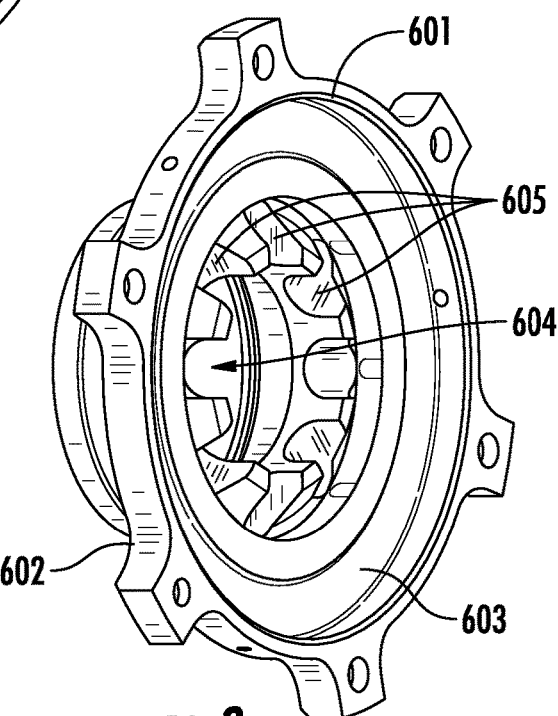
FIG. 8 is a perspective view of the modified carrier support of FIG. 7.
Figure 9:
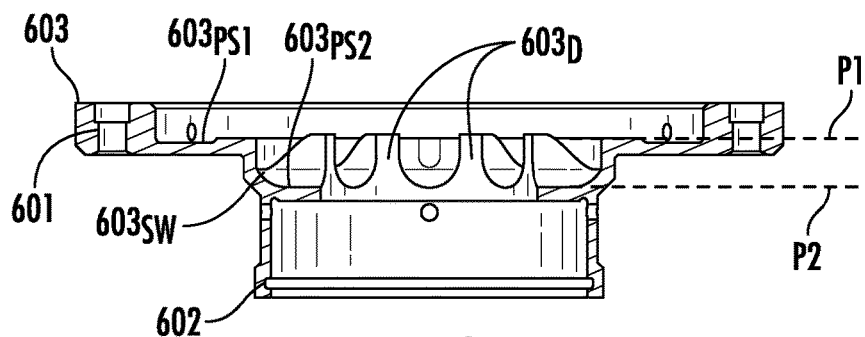
FIG. 9 is a side cutaway view of the modified carrier support of FIG. 7 taken along line 9-9.

As shown in FIGS. 7-9, the carrier support 601 includes a first side 602 and a second side 603 that opposes the first side 602. The modified carrier support 601 is also formed to define a second aperture 604 that extends through the carrier support 601 between the first side 602 and the second side 603. During operations of the SEC 1, the modified carrier support 601 is rotatable about a central longitudinal axis of the second aperture 604.

The second side 603 of the carrier support 601 is formed to define pockets 605 that are circumferentially arrayed about the second aperture 604. In particular, the second side 603 includes a first planar surface $603_{PS1}$ that defines a first plane P1, a second planar surface $603_{PS2}$ that defines a second plane P2, an inwardly curving sidewall $603_{SW}$ that extends from an interior edge of the first planar surface $603_{PS1}$ to the exterior edge of the second planar surface $603_{PS2}$ and radial dividers $603_D$. The radial dividers $603_D$ are oriented along the radial dimension of the second aperture 604 and extend toward the first planar surface $603_{PS1}$ from the second planar surface $603_{PS2}$ and radially inwardly from the inwardly curving sidewall $603_{SW}$ to delimit and define each of the pockets 605. The pockets 605 may be substantially uniformly arrayed in the circumferential dimension about the second aperture 604 with neighboring radial dividers $603_D$ cooperatively delimiting and defining respective ones of the pockets 605.

Figure 10:
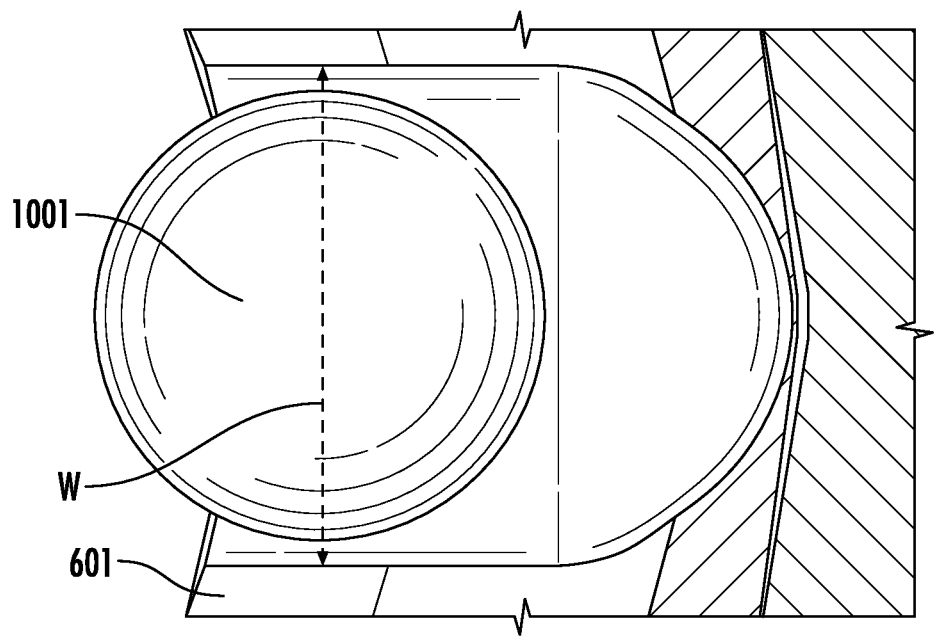
FIG. 10 is an axial view of an engagement ball retained within a pocket of the carrier support of FIGS. 7-9.
Figure 11:
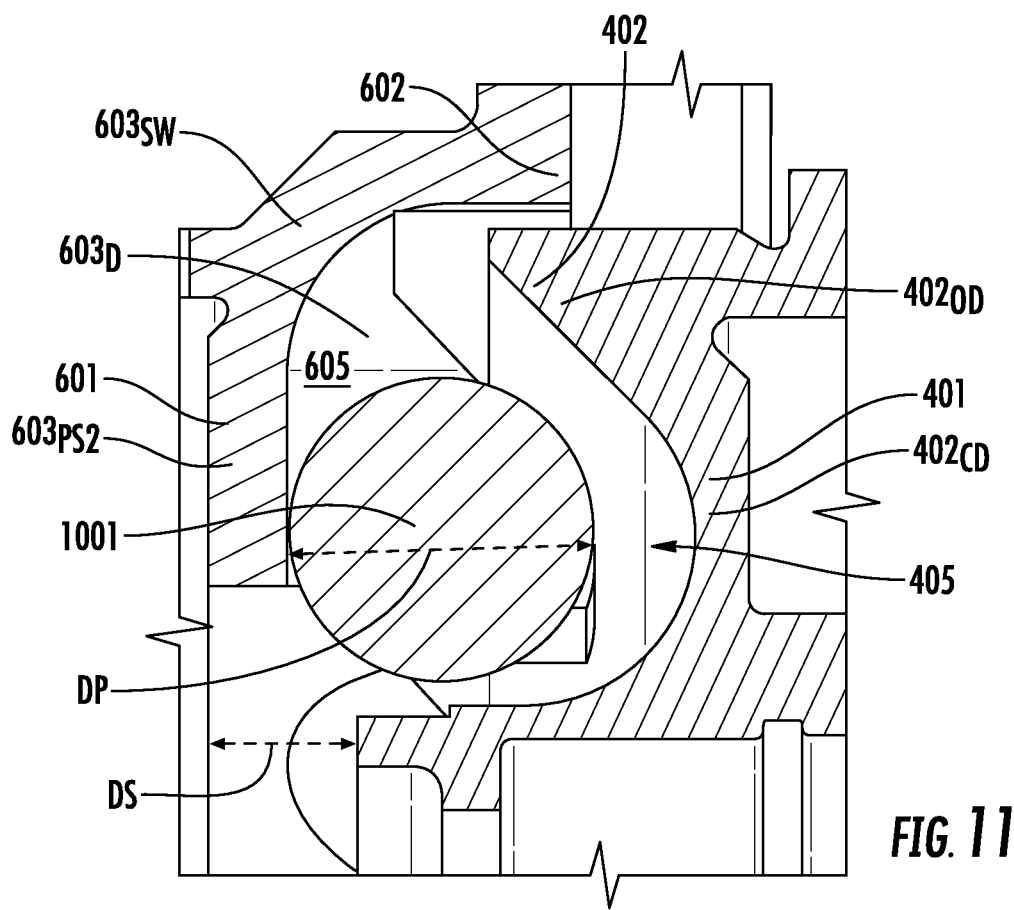
FIG. 11 is a circumferential view of an engagement ball retained within a pocket of the carrier support of FIGS. 7-9 and an annular groove of the starter ball guide of FIGS. 4-6.

With reference to FIGS. 10 and 11, the modified starter ball guide 401 and the modified carrier support 601 are disposable with respect to one another such that the first side 402 of the modified starter ball guide 401 faces the second side 602 of the modified carrier support 601. In particular, the modified starter ball guide 401 and the modified carrier support 601 are disposable with respect to one another at a distance DS at which engagement balls 1001 (e.g., the engagement balls 2 of FIGS. 1-3) are respectively retainable in corresponding ones of the pockets 605 and in a corresponding circumferential segment of the annular groove 405.

In accordance with embodiments and, as shown in FIGS. 10 and 11, each pocket 605 has a depth DP which is at least equal or greater than a radius of the engagement balls 1001 and a circumferential width W which exceeds a diameter of the engagement balls 1001. At least the depth DP of each pocket 605 insures full contact between the engagement balls 1001 and the circumferential face of each of the radial dividers $603_D$.

In accordance with embodiments and, as shown in FIG. 11, a profile of the second side 602 of the carrier support 601 at each of the pockets 605 may at least partially mimic a complementary profile of the first side 402 of the starter ball guide 401 at the annular groove 405. That is, while the second planar surface $603_{PS2}$ and the inwardly curving sidewall $603_{SW}$ of the second side 602 of the carrier support 601 extend and curve around the curved central diameter $402_{CD}$ and the shallow-tapered outer diameter $402_{OD}$ of the first side 402 of the starter ball guide 401, the radial dividers $603_D$ fit into the corresponding circumferential segment of the annular groove 405. For example, a tapering of a distal edge of each of the radial dividers $603_D$ (i.e., the profile of each of the radial dividers $603_D$) mimics or substantially follows a taper of the shallow-tapered outer diameter $402_{OD}$.

Benefits of the features described herein are that any edge contact of the engagement balls 1001 to the interior components of the carrier support 11 are eliminated. In addition, the features described herein provide for full transmission of axial forces while having a significantly improved ball retention capability regardless of whether the SEC is engaged or disengaged.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A synchronous engagement clutch (SEC) assembly, comprising:
    a starter ball guide comprising opposed first and second sides;
    a carrier support comprising opposed first and second sides,
    the first side of the starter ball guide defining an aperture and an annular groove that tapers with increasing distance from the aperture,
    the first side of the starter ball guide comprising an outer diameter and an inner diameter that is taller in an axial direction than the outer diameter,
    the second side of the carrier support defining pockets, and
    the starter ball guide and the carrier support being disposable with the first side of the starter ball guide facing the second side of the carrier support such that engagement balls are retainable in the pockets and the annular groove.

2. The SEC assembly according to claim 1, wherein a profile of the second side of the carrier support at each of the pockets mimics a profile of the first side of the starter ball guide at the annular groove.

3. The SEC assembly according to claim 1, wherein the carrier support comprises radial dividers delimiting each pocket.

4. The SEC assembly according to claim 3, wherein a profile of each radial divider mimics a profile of the annular groove.

5. The SEC assembly according to claim 1, wherein each pocket has a depth which is at least equal to or greater than a radius of the engagement balls.

6. The SEC assembly according to claim 1, wherein each pocket has a circumferential width which exceeds a diameter of the engagement balls.

7. A synchronous engagement clutch (SEC) assembly, comprising:
    engagement balls;
    a starter ball guide comprising opposed first and second sides and defining a first aperture extending between the first and second sides;
    a carrier support comprising opposed first and second sides and defining a second aperture extending between the first and second sides,
    the first side of the starter ball guide defining an annular groove about the first aperture wherein the annular groove tapers with increasing distance from the first aperture, the first side of the starter ball guide comprising an outer diameter and an inner diameter that is taller in an axial direction than the outer diameter, the second side of the carrier support defining pockets arrayed about the second aperture, and the starter ball guide and the carrier support being disposable with the first side of the starter ball guide facing the second side of the carrier support at a distance at which the engagement balls are respectively retainable in corresponding ones of the pockets and the annular groove.

8. The SEC assembly according to claim 7, wherein a profile of the second side of the carrier support at each of the pockets mimics a profile of the first side of the starter ball guide at the annular groove.

9. The SEC assembly according to claim 7, wherein the carrier support comprises radial dividers delimiting each pocket.

10. The SEC assembly according to claim 9, wherein a profile of each radial divider mimics a profile of the annular groove.

11. The SEC assembly according to claim 7, wherein each pocket has a depth which is at least equal to or greater than a radius of the engagement balls.

12. The SEC assembly according to claim 7, wherein each pocket has a circumferential width which exceeds a diameter of the engagement balls.

13. A synchronous engagement clutch (SEC) assembly, comprising:

a starter ball guide comprising opposed first and second sides a defining a first aperture;

a carrier support comprising opposed first and second sides, the first side of the starter ball guide comprising a steep-walled inner diameter, a shallow-tapered outer diameter, wherein the steep-walled inner diameter is taller in an axial direction than the shallow-tapered outer diameter, and a curved central diameter radially interposed between the steep-walled inner diameter and the shallow-tapered outer diameter to define an annular groove that tapers with increasing radial distance from the first aperture, the second side of the carrier support comprising an inwardly curving sidewall and radial dividers extending from the inwardly curving sidewall to define pockets, and the starter ball guide and the carrier support being disposable with the first side of the starter ball guide facing the second side of the carrier support such that engagement balls are retainable in the pockets and the annular groove.

14. The SEC assembly according to claim 13, wherein a profile of the second side of the carrier support at each of the pockets mimics a profile of the first side of the starter ball guide at the annular groove.

15. The SEC assembly according to claim 13, wherein the carrier support is formed to define second aperture.

16. The SEC assembly according to claim 13, wherein a profile of each radial divider mimics a profile of the annular groove.

17. The SEC assembly according to claim 13, wherein each pocket has a depth which is at least equal to or greater than a radius of the engagement balls.

18. The SEC assembly according to claim 13, wherein each pocket has a circumferential width which exceeds a diameter of the engagement balls.

\* \* \* \* \*